(12) United States Patent
Ding et al.

(10) Patent No.: US 10,514,712 B2
(45) Date of Patent: Dec. 24, 2019

(54) METHOD AND APPARATUS FOR PRESSURE-BASED FLOW MEASUREMENT IN NON-CRITICAL FLOW CONDITIONS

(71) Applicant: MKS INSTRUMENTS, INC., Andover, MA (US)

(72) Inventors: Junhua Ding, Boxborough, MA (US); Michael L'Bassi, Sterling, MA (US)

(73) Assignee: MKS Instruments, Inc., Andover, MA (US)

( * ) Notice: Subject to any disclaimer, the term of this patent is extended or adjusted under 35 U.S.C. 154(b) by 498 days.

(21) Appl. No.: 15/244,264

(22) Filed: Aug. 23, 2016

(65) Prior Publication Data
US 2017/0060143 A1    Mar. 2, 2017

Related U.S. Application Data

(60) Provisional application No. 62/212,212, filed on Aug. 31, 2015.

(51) Int. Cl.
*G05D 7/06* (2006.01)
*G01F 1/36* (2006.01)
(Continued)

(52) U.S. Cl.
CPC .......... *G05D 7/0635* (2013.01); *G01F 1/363* (2013.01); *G01F 1/50* (2013.01); *G01F 15/005* (2013.01)

(58) Field of Classification Search
CPC .. G05D 7/0635; G05D 7/0647; G05D 7/0641; G05D 7/0652; G05D 7/0658;
(Continued)

(56) References Cited

U.S. PATENT DOCUMENTS 7,216,019 B2    5/2007    Tinsley
7,826,986 B2    11/2010   McDonald
(Continued)

FOREIGN PATENT DOCUMENTS

WO    2008014076 A2    1/2008

OTHER PUBLICATIONS

International Search Report dated Nov. 23, 2016 in corresponding application No. PCT/US2016/048126.
(Continued)

*Primary Examiner* — Thomas C Lee
*Assistant Examiner* — Charles Cai
(74) *Attorney, Agent, or Firm* — Hamilton, Brook, Smith & Reynolds, P.C.

(57) ABSTRACT

Methods, systems, and apparatus for pressure-based flow measurement are provided. A processor receives, from the pressure-based mass flow controller (MFC), an upstream pressure value $P_u$. The processor computes, for the pressure-based mass flow controller (MFC), a downstream pressure value $P_d$ based on the received upstream pressure value $P_u$. The processor computes, for the pressure-based mass flow controller (MFC), a flow rate Q based on the received upstream pressure value $P_u$ and the computed downstream pressure value $P_d$. The processor controls a flow through the pressure-based mass flow controller (MFC) based on the computed flow rate Q. The methods, systems, and apparatus can be used for flow measurement in non-critical or un-choked flow conditions.

19 Claims, 10 Drawing Sheets

(51) Int. Cl.
*G01F 1/50* (2006.01)
*G01F 15/00* (2006.01)

(58) Field of Classification Search
CPC .......... G05D 16/0661; G05D 23/1927; Y10T
137/7759; Y10T 137/7761; Y10T
137/0324; Y10T 137/776; Y10T
137/0379; Y10T 137/0396; Y10T
137/0368; Y10T 137/0402; Y10T
137/87684; Y10T 137/877; Y10T
137/2496; Y10T 137/2632; Y10T
137/6416; Y10T 137/7722; Y10T
137/7737; Y10T 137/7758; Y10T
137/7762; Y10T 137/7784; Y10T
137/8158; Y10T 137/8175; Y10T
137/8326; Y10T 137/8593; Y10T
137/86348; Y10T 137/86397; Y10T
137/86734; Y10T 137/86815; G01F
15/005; G01F 1/363; G01F 1/50
USPC .... 137/487.5, 486, 14, 15.01, 2, 10, 115.22,
137/12, 334, 468, 497, 552, 561 R, 861;
700/82, 300, 47, 45, 50, 1, 130, 33, 85,
700/282
See application file for complete search history.

(56) References Cited

U.S. PATENT DOCUMENTS

| | | |
|---|---|---|
| 8,418,714 B2 | 4/2013 | Ohmi |
| 8,789,556 B2 | 7/2014 | Yasuda |
| 2002/0082783 A1 | 6/2002 | Grosshart |
| 2004/0204794 A1* | 10/2004 | Ohmi ................... G05D 7/0635 700/282 |
| 2008/0167748 A1 | 7/2008 | Ding et al. |
| 2009/0063059 A1 | 3/2009 | Nakada et al. |
| 2009/0112491 A1* | 4/2009 | Nakada ............... G01F 25/0038 702/47 |
| 2009/0112504 A1* | 4/2009 | Ding ...................... G01F 22/02 702/100 |
| 2013/0092257 A1* | 4/2013 | Yasuda ............... G01F 25/0053 137/487 |
| 2014/0083514 A1* | 3/2014 | Ding .................... G05D 7/0647 137/12 |
| 2015/0039140 A1 | 2/2015 | Ellec |

OTHER PUBLICATIONS

Sullivan et al., "Mass Flow Measurement and Control of Low Vapor Pressure Sources", Journal of Vacuum Science & Technology: Part A, 7(3):2387-2392, May 1, 1989.

* cited by examiner

METHOD AND APPARATUS FOR PRESSURE-BASED FLOW MEASUREMENT IN NON-CRITICAL FLOW CONDITIONS

RELATED APPLICATION

This application claims priority to and benefit of U.S. Provisional Patent Application No. 62/212,212, filed Aug. 31, 2015 and entitled "Method and Apparatus for Pressure-Based Flow Measurement in Non-Critical Flow Conditions"; the entire content of which application is incorporated herein by reference.

SUMMARY

The subject technology generally relates to flow measurement in non-critical flow conditions.

Mass flow controller (MFC) and mass flow verifier (MFV) technology is generally available. According to one scheme, a MFC or MFV may include two pressure meters (also referred to as sensors)—an upstream pressure meter and a downstream pressure meter—and may compute the flow rate based on the upstream pressure measured by the upstream pressure meter and the downstream pressure measured by the downstream pressure meter. One drawback of this scheme is that it requires two pressure meters, which may increase the cost of manufacturing the MFC or MFV. As the foregoing illustrates, new approaches to pressure-based flow measurement may be desirable.

FIG. 1 illustrates a first example of a pressure-based MFC 100. As shown, the MFC 100 includes a proportional control valve 105, a temperature sensor 110, an inlet pressure 115, an outlet pressure (P2) 120, an orifice 125, a controlled pressure (P1) 130, a capacitance manometer 135 operative as a single pressure sensor for the device, and proportional integral derivative (PID) control electronics 140.

The MFC 100 operates by controlling the mass flow of gas through the orifice 125. The amount of mass flow of gas the MFC 100 provides, as well as the gases which the MFC is designed to pass through the orifice 125 are set by the manufacturer of the MFC 100 or the user of the MFC 100.

The proportional control valve 105 adjusts the volume of gas flowing through the orifice 125. The proportional control valve 105 may include a proportional solenoid. Application of a voltage to the proportional solenoid may change the speed at which a spool shifts or a distance which the spool travels, thereby adjusting a volume of flowing gas responsive to the position of the spool. Alternatively, any other suitable control valve may be used in place of the proportional control valve 105 described above.

The temperature sensor 110 senses a temperature of the gas. For example, the temperature sensor 110 may include a thermocouple (and/or any other suitable temperature sensor). The inlet pressure 115 is measured by a pressure sensor at the inlet of the orifice 125. The outlet pressure 120 is measured by a pressure sensor at the outlet of the orifice 125. The pressure of the gas passing through the orifice 125 may be controlled (e.g., by electronic circuitry/logic in the MFC 100 or a computer coupled with the MFC 100), as shown by controlled pressure 130. The pressure may be measured using the capacitance manometer 135, which may include a metal diaphragm, based on a change in capacitance between the metal diaphragm and an adjacent, fixed electrode structure.

As shown, the MFC 100 also includes PID control electronics 140. The PID control electronics implement a control loop feedback mechanism that measures a value (e.g., flow rate Q of gas flowing through the orifice 125), calculates an error between the measured value and a desired value, and attempts to manipulate one or more controlled variables to reduce the error. Using this control loop feedback mechanism, the PID control electronics 140 may control the flow rate Q of gas flowing through the orifice 125.

For example, the PID control electronics 140 may control the operation of the inlet valve (where the inlet pressure 115 is measured) and the outlet valve (where the outlet pressure 120 is measured) of the MFC 100. In one implementation of the MFC 100, the PID control electronics 140 may implement a "rate-of-rise" (ROR) technique flow control technique to perform mass flow control. When the ROR technique is implemented, the flow rate of the gas is determined by causing the gas to flow into a known volume, such as the orifice 125, and measuring the pressure rise that occurs at the outlet pressure 120 during a given interval of time.

One challenge associated with the MFC 100 is measuring non-critical flow, is that both an upstream pressure and a downstream pressure are required to measure the non-critical flow. (See Equation 4 below.) For the situation, where only an upstream pressure sensor is present (as shown), the MFC may produce erroneous or unreliable flow measurements.

Including two pressure sensors, i.e., an upstream sensor and a downstream sensor can provide the needed downstream pressure measurement for non-critical flow measurement. Having two pressure sensors, rather than only a single pressure sensor, is expensive and may increase the cost of manufacturing the MFC 100 by approximately $500 or 30-40%.

FIG. 2 illustrates a second example pressure-based MFC 200, which has two pressure sensors. For example, some components of the MFC 200 may correspond to some components of the Criterion D500® manufactured by Horiba, Ltd., of Kyoto, Japan. As shown, the MFC 200 includes a gas inlet 205, a gas outlet 210, an upstream pressure sensor 215, a downstream pressure sensor 220, a flow restrictor 225, and a temperature sensor 230.

In the MFC 200, gas enters through the gas inlet 205 and exits through the gas outlet. The upstream pressure sensor 215 measures the upstream pressure $P_u$ of the gas and the downstream pressure sensor 220 measures the downstream pressure $P_d$ of the gas. The temperature sensor 230 measures the temperature of the gas. The flow restrictor 225 restricts flow of the gas. The flow rate Q may be computed based on $P_u$ and $P_d$, as set forth below, and may be controlled, in the MFC 200, using the flow restrictor 225.

One drawback of the MFC 200 is that the MFC 200 includes two pressure sensors 215 and 220. The second pressure sensor 220 contributes heavily to the cost and may make the MFC 200 around 30-40% more expensive or $500 more expensive than the MFC 200 would have been had the MFC 200 lacked the downstream pressure sensor 220 and included only a single upstream pressure sensor 215.

As set forth above, two pressure sensors 215 and 220 are needed in the MFC 200 because the flow rate Q is calculated based on the two measured pressures $P_u$ and $P_d$.

A flow through a nozzle (e.g., orifice 125 or gas outlet 210) of a MFC (e.g., MFC 100 or MFC 200) may be critical or non-critical. Critical flow is also known as choked flow, and non-critical flow is also known as non-choked flow. In critical flow, gas may travel at the speed of sound. Under critical flow, the condition of Equation 1 is satisfied.

$$\frac{P_d}{P_u} < \left(\frac{2}{\gamma+1}\right)^{\gamma/(\gamma-1)} \quad \text{(Equation 1)}$$

In Equation 1, $P_d$ is the downstream pressure, $P_u$ is the upstream pressure, and y is the ratio of specific heats of the gas. For example, for the gas nitrogen $\gamma=1.40$. During critical flow, the flow rate Q is independent of the downstream pressure $P_d$. Specifically, the flow rate Q or Qcf may be calculated using Equation 2.

$$Q = Q_{cf} = C' \cdot A \cdot P_u \cdot \left(\frac{R \cdot T}{M} \frac{2\gamma}{\gamma+1}\right)^{1/2} \cdot \left(\frac{2}{\gamma+1}\right)^{\gamma/(\gamma-1)} \quad \text{(Equation 2)}$$

In Equation 2, C' is the discharge coefficients, A is the throat area of the nozzle (e.g., orifice 125) Pu is the upstream pressure, R is the universal gas constant, which is approximately equal to 8.314 J/(mol*K), T is the gas temperature, M is the gas molecular weight, and $\gamma$ is the ratio of specific heats of the gas. Notably, Equation 2 does not require the downstream pressure Pd in its calculation of Q.

Under non-critical flow, the condition of Equation 1 is not satisfied and, therefore, the condition of Equation 3 is satisfied.

$$\frac{P_d}{P_u} \geq \left(\frac{2}{\gamma+1}\right)^{\gamma/(\gamma-1)} \quad \text{(Equation 3)}$$

Under non-critical flow, the flow rate Q or $Q_{ncf}$ may be calculated according to Equation 4.

$$Q = Q_{ncf} = $$
$$C' \cdot A \cdot P_u \cdot \left(\frac{R \cdot T}{M} \frac{2\gamma}{\gamma-1}\right)^{1/2} \cdot \left(\frac{P_d}{P_u}\right)^{1/\gamma} \cdot \left[1 - \left(\frac{P_d}{P_u}\right)^{(\gamma-1)/\gamma}\right]^{1/2} \quad \text{(Equation 4)}$$

Notably, in Equation 4, both the upstream pressure $P_u$ and the downstream pressure $P_d$ may be used to calculate the non-critical flow rate Q or $Q_{ncf}$. As a result of Equation 4, the downstream pressure sensor 220 is used in the WC 200, increasing the manufacturing cost of the WC 200.

Aspects of the subject technology relate to a system for pressure-based flow measurement in non-critical (un-choked) flow conditions. The system can include one or more processors coupled with a pressure-based mass flow controller and a memory. The memory stores instructions which are executable by the one or more processors. The instructions include code to receive, from the pressure-based mass flow controller (MFC), an upstream pressure value $P_u$. The instructions include code to compute, for the pressure-based mass flow controller (WC), a downstream pressure value $P_d$ based on the received upstream pressure value $P_u$. The instructions include code to compute, for the pressure-based mass flow controller (WC), a flow rate Q based on the received upstream pressure value $P_u$ and the computed downstream pressure value $P_d$. The instructions include code to control a flow through the pressure-based mass flow controller based on the computed flow rate Q.

Further aspects of the subject technology relate to a system for pressure-based flow measurement in non-critical (un-choked) flow conditions. The system can include one or more processors coupled with a pressure-based mass flow controller and a memory. The memory stores instructions which are executable by the one or more processors. The instructions include code to receive an initial downstream pressure value $P_{d0}$ for the pressure-based mass flow controller. The instructions include code to set a stored downstream pressure value $P_d$ to the received initial downstream pressure value $P_{d0}$. The instructions include code to calculate (or compute) the flow rate Q according to critical or non-critical flow conditions. The instructions include code to repeat the flow rate calculations, until the values of a computed flow rate Q and $P_d$ converge to within a pre-defined error threshold: receiving, from the pressure-based mass flow controller, an upstream pressure value $P_u$; determining, based on $P_d$ and $P_u$, whether a flow condition in the pressure-based mass flow controller is critical or non-critical; computing Q based on whether the flow condition is critical or non-critical; and updating $P_d$ based on the computed value of Q. The instructions include code to, after the computed flow rate Q and the stored downstream pressure value $P_d$ converge, control a flow through the pressure-based mass flow controller based on the computed flow rate Q.

Additional aspects of the subject technology relate to a non-transitory machine-readable medium storing instructions for pressure-based flow measurement in non-critical (un-choked) flow conditions. The instructions include code to receive, from the pressure-based mass flow controller, an upstream pressure value $P_u$. The instructions include code to compute, for the pressure-based mass flow controller, a downstream pressure value $P_d$ based on the received upstream pressure value $P_u$. The instructions include code to compute, for the pressure-based mass flow controller, a flow rate Q based on the received upstream pressure value $P_u$ and the computed downstream pressure value Pd. The instructions include code to control a flow through the pressure-based mass flow controller based on the computed flow rate Q.

Further aspects of the subject technology relate to a non-transitory machine-readable medium storing instructions for pressure-based flow measurement in non-critical (un-choked) flow conditions. The instructions include code to receive an initial downstream pressure value $P_{d0}$ for the pressure-based mass flow controller. The instructions include code to set a stored downstream pressure value Pd to the received initial downstream pressure value $P_{d0}$. The instructions include code to repeat, until the values of a computed flow rate Q and $P_d$ converge to within a pre-defined error threshold: receiving, from the pressure-based mass flow controller, an upstream pressure value $P_u$; determining, based on $P_d$ and $P_u$, whether a flow condition in the pressure-based mass flow controller is critical or non-critical; computing Q based on whether the flow condition is critical or non-critical; and updating $P_d$ based on the computed value of Q. The instructions include code to, after the computed flow rate Q and the stored downstream pressure value $P_d$ converge, control a flow through the pressure-based mass flow controller based on the computed flow rate Q.

Further aspects of the subject technology relate to a method for pressure-based flow measurement in non-critical (un-choked) flow conditions. The method includes receiving, from a pressure-based mass flow controller (MFC), an upstream pressure value $P_u$. The method includes computing, for the pressure-based MFC, a downstream pressure value $P_d$ based on the received upstream pressure value $P_u$. The method includes computing, for the pressure-based MFC, a flow rate Q based on the received upstream pressure value $P_u$ and the computed downstream pressure value $P_d$.

The method includes controlling a flow through the pressure-based MFC based on the computed flow rate Q.

Further aspects of the subject technology relate to a method for pressure-based flow measurement in non-critical (un-choked) flow conditions. The method includes receiving an initial downstream pressure value $P_{d0}$ for a pressure-based mass flow controller (MFC). The method incudes setting a stored downstream pressure value $P_d$ to the received initial downstream pressure value $P_{d0}$. The method includes repeating—until the values of the downstream pressure $P_d$ and the computed flow rate Q converge—receiving, from the pressure-based MFC an upstream pressure value $P_u$; determining, based on $P_d$ and $P_u$, whether a flow condition in the pressure-based MFC is critical or non-critical; computing Q based on whether the flow condition is critical or non-critical; and updating $P_d$ based on the computed value of Q. The method includes, after the values of $P_d$ and Q have converged, controlling a flow through the pressure-based MFC based on the computed flow rate Q.

Additional aspects of the subject technology relate to a system for pressure-based flow measurement in non-critical (un-choked) flow conditions. The system includes one or more processors coupled with a pressure-based mass flow controller and a memory. The memory stores instructions which are executable by the one or more processors. The instructions include code to receive, from the pressure-based mass flow controller, an upstream pressure value $P_u$. The instructions include code to receive, from a sensor external to the pressure-based mass flow controller, a downstream pressure value $P_d$. The instructions include code to compute, for the pressure-based mass flow controller, a flow rate Q based on the received upstream pressure value Pu and the received downstream pressure value $P_d$. The instructions include code to control a flow through the pressure-based mass flow controller based on the computed flow rate Q.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
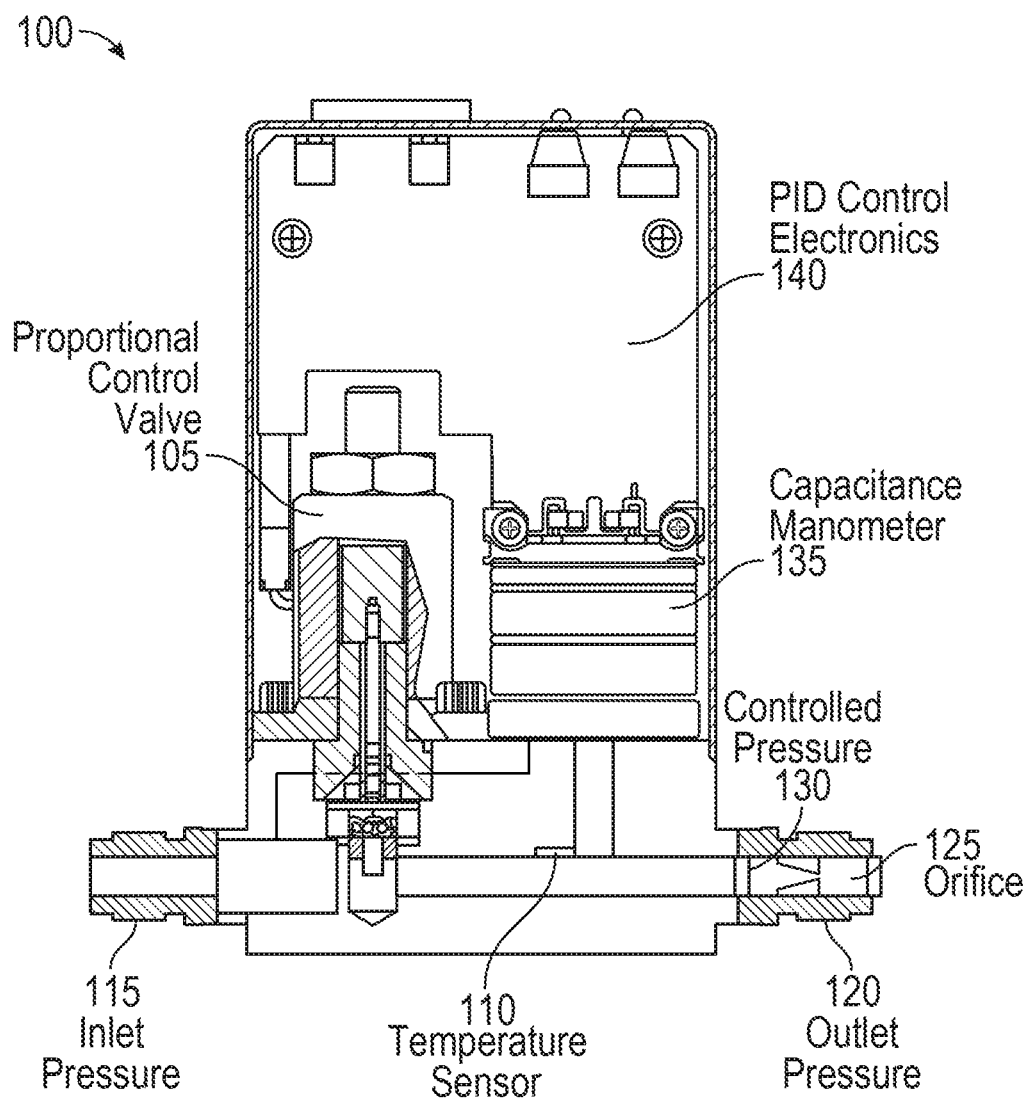
FIG. 1 illustrates a first example of a pressure-based mass flow controller (MFC).
Figure 2:
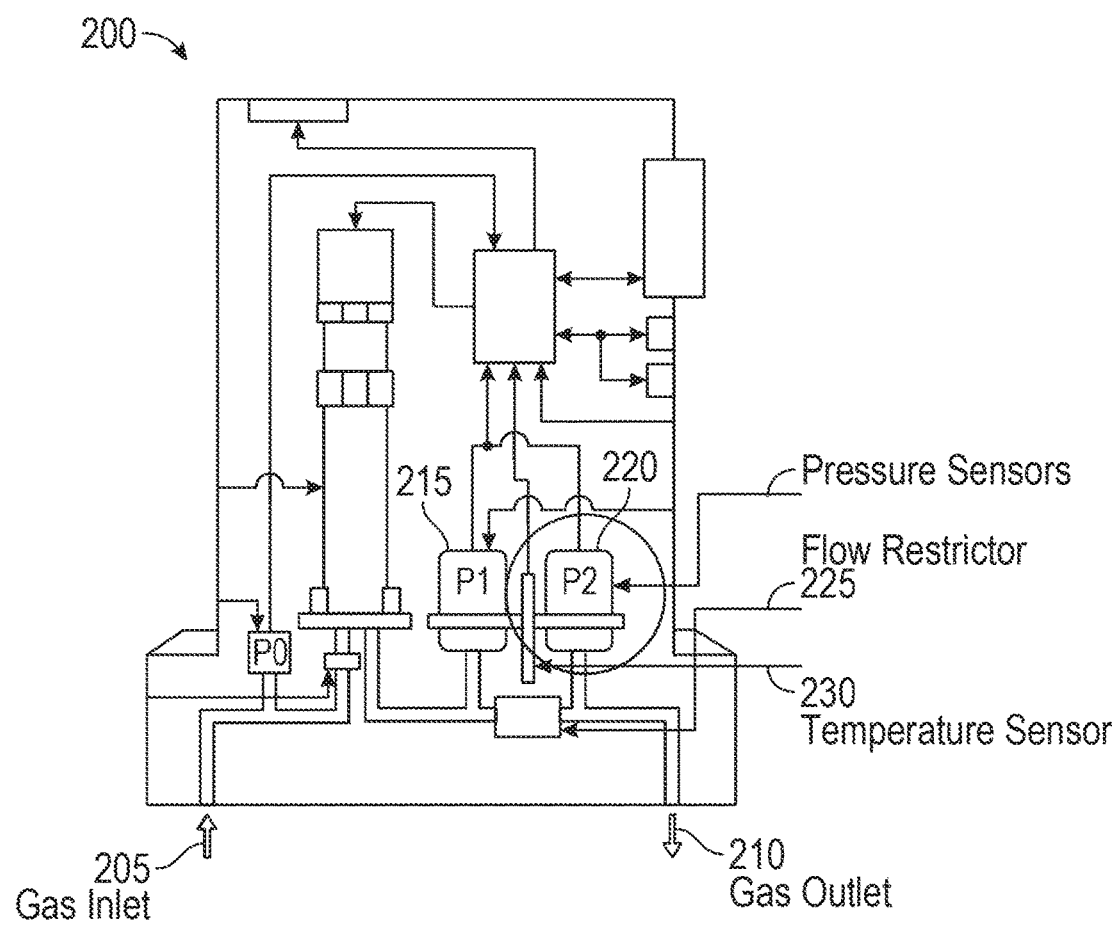
FIG. 2 illustrates a second example pressure-based mass flow controller (MFC) that has two pressure sensors.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology relates to pressure-based flow measurement in a pressure-based mass flow controller (MFC) or mass flow verifier (MFV). According to some implementations, one or more processors and a memory (e.g., a memory unit such as a suitable chip or register), can be coupled with a pressure-based MFC or included in the MFC. The one or more processors can receive, from the MFC, an upstream pressure value $P_u$ measured by a sensor in the MFC. The one or more processors are operative to compute, for the MFC, a downstream pressure value $P_d$ based on the received upstream pressure value $P_u$. The one or more processors can compute, for the MFC, a flow rate Q based on the received upstream pressure value $P_u$ and the computed downstream pressure value $P_d$. The one or more processors can control a flow through the MFC based on the computed flow rate Q. In some embodiments, the one or more processors may be linked to or included within a computer.

As used herein, MFC or MFV is a device used to measure, control or verify the flow of liquids and gases, for example, through an orifice. A MFC or MFV may be designed and calibrated to control a specific type of liquid or gas at a particular range of flow rates or temperatures. The terms MFC and MFV may be used interchangeably.

The subject technology, according to some implementations, provides for internal downstream pressure $P_d$ estimation using a single upstream pressure sensor to obtain the upstream pressure $P_u$. When a valve of a pressure-based MFC (e.g., MFC 100 or MFC 200) is fully closed, the flow Q may be zero and the internal upstream pressure $P_u$ may be stabilized. A computer (e.g., a computer within the MFC or coupled with the MFC) may receive, from the upstream pressure sensor (e.g., upstream pressure sensor 215), a measurement of the upstream pressure $P_u$ under these circumstances, and store this measurement as the initial downstream pressure $P_{d0}$. During operation of the MFC, after opening the valve, the downstream pressure $P_d$ may be estimated using Equation 5.

$$P_d = P_{d0} + f(Q, P_u, \gamma, M) \quad \text{(Equation 5)}$$

In Equation 5, f(Q, Pu, γ, M) is a function of the flow rate through the nozzle Q, the upstream pressure Pu, and properties of the gas γ and M Different functions f(.) may be used in conjunction with the subject technology. For example, f(.) may be a linear function of all variables, a quadratic function of all variables, an exponential function of all variables, a logarithmic function of all variables, or a function of different degrees and types for different variables, such as, for a non-limiting example, an exponential function of γ, a linear function of Q, a cubic function of $P_u$, and a quadratic function of M. Equation 6 (below) provides an example of the function f(.), where f(.) is a linear function of each of the four input variables.

$$f(Q, P_u, \gamma, M) = k1*Q + k2*P_u + k3*\gamma + k4*M \quad \text{(Equation 6)}$$

In Equation 6, the coefficients k1, k2, k3, and k4 are constants. Equation 6 provides one example of the function f(.) in which the noted variables have linear weights. However, the subject technology may be used with the function given in Equation 6 or with other versions of the function f(.).

Figure 8:
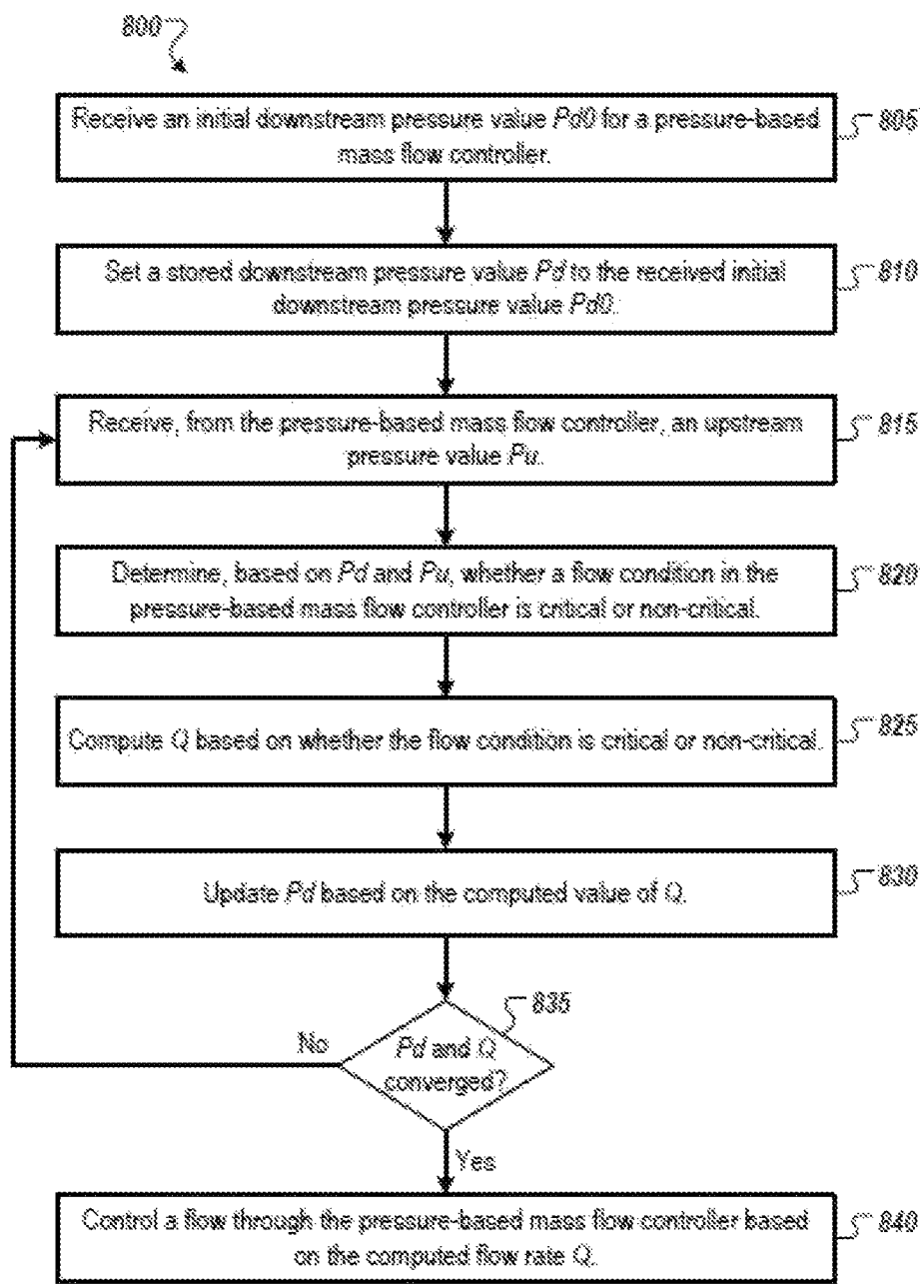
FIG. 8 illustrates a second example process for computing a downstream pressure value and a flow rate for a mass flow controller.

Using Equations (1)-(6), the flow rate Q in a pressure-based MFC (e.g., MFC 200) having an upstream pressure sensor (e.g., upstream pressure sensor 215) but lacking a downstream pressure sensor (e.g., downstream pressure sensor 220) may be calculated using the following process, which is also described in conjunction with FIG. 8:

(1) Set $P_d = P_{d0}$. [FIG. 8, Step 810]
(2) Obtain the upstream pressure $P_u$ from the upstream pressure sensor. [FIG. 8, Step 815]
(3) Determine whether the flow condition is critical or non-critical using Equation (1) or Equation (3). [FIG. 8, Step 820]
(4) Calculate the flow rate Q by using either the critical flow equation, Equation 2, if the flow condition is critical, or the non-critical flow equation, Equation 4, if the flow condition is non-critical. [FIG. 8, Step 825]
(5) Update the downstream pressure $P_d$ based on the calculated flow rate Q using Equation (5). [FIG. 8, Step 830]
(6) Repeat steps (2)-(5) until both Q and $P_d$ have converged. [FIG. 8, Step 835]

In the process described above, the value of $P_{d0}$ may be updated if the flow setpoint (SP) is zero. Notably, the process described above may be completed without ever having to measure $P_d$ and, thus, without requiring a downstream pressure sensor (e.g., downstream pressure sensor 220).

As used herein, a value that is calculated iteratively is said to have converged if successive calculations of the value are within a threshold percentage of previous calculations. The threshold percentage may be 0.05%, 0.1%, 0.5%, 1%, etc. In some cases, different threshold percentages may be used for different convergences. For example, the value of Q may be said to have converged when successive calculations are within 0.1% of one another, while the value of $P_d$ may be said to have converged when successive calculations are within 0.05% of one another.

Figure 3:
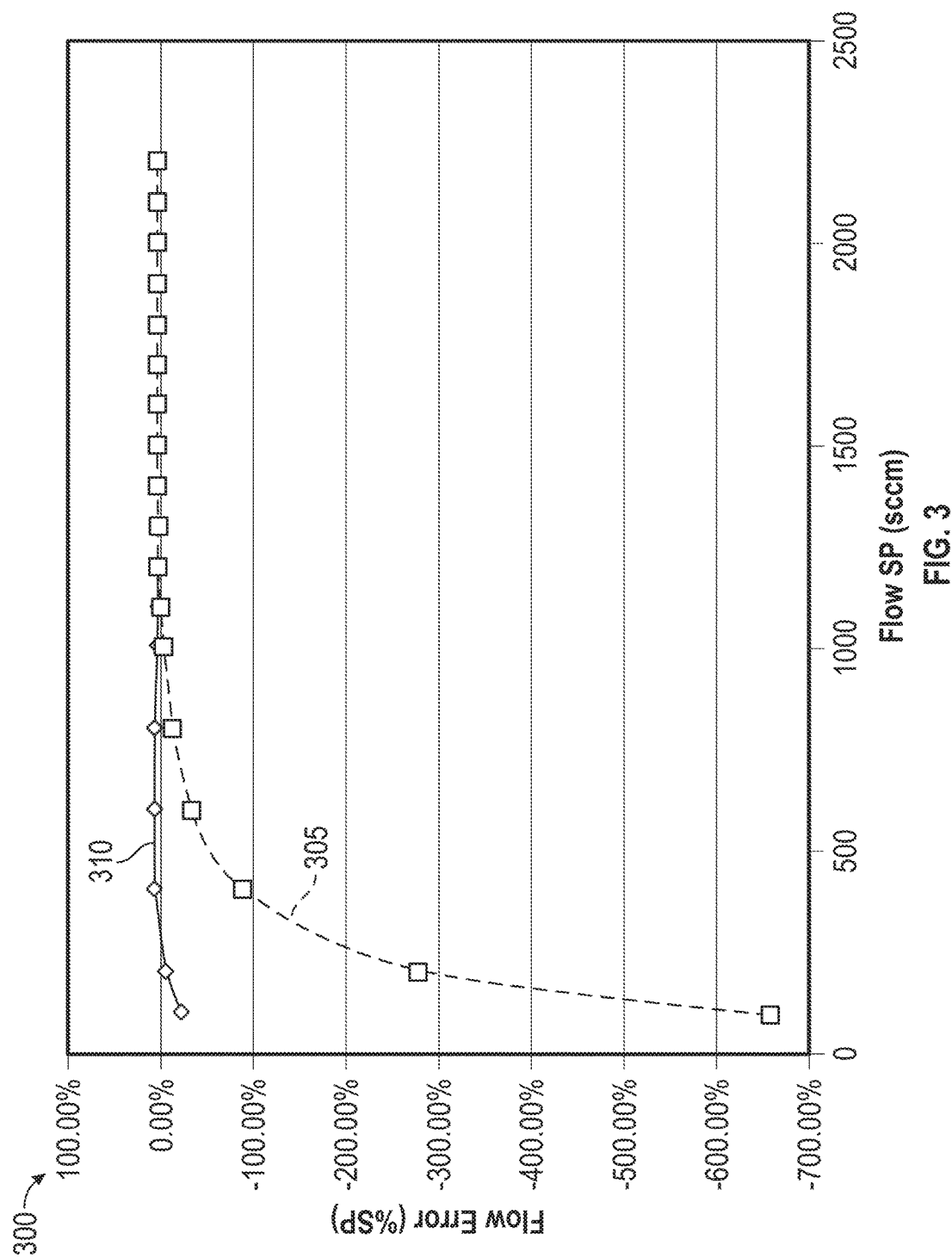
FIG. 3 illustrates an example flow calculation error using a first aspect of the subject technology.

FIG. 3 illustrates a graph 300 of flow calculation error using aspects of the subject technology. In the graph 300 of FIG. 3, the flow of a pressure-based MFC is provided taking into account the measured upstream pressure $P_u$, without measuring the downstream pressure $P_d$. Curve 305 is based on using critical flow calculation alone, whereas curve 310 uses the internal downstream pressure estimation technique described above in conjunction with equations (1)-(6). As illustrated in FIG. 3, the curve 310 converges much faster than the curve 305, but both curves eventually converge at the same result.

The accuracy of flow calculation in the non-critical flow range may be further improved. According to some aspects of the subject technology, a weighting function may be used for flow calculation. An example of a weighing function is provided in Equation 7.

$$Q = w*Q_{cf} + (1-w)*Q_{ncf} \quad \text{(Equation 7)}$$

In Equation 7, w is the weighting factor, $Q_{cf}$ is defined by Equation 2, and $Q_{ncf}$ is defined by Equation 4. The weighting factor w is a function of the flow rate, the upstream pressure, the downstream pressure, the ratio of specific heats of the gas, and the gas molecular weight, as set forth in Equation 8.

$$w = f_w(Q, P_u, P_d, \gamma, M) \quad \text{(Equation 8)}$$

According to some examples, the weighing function $f_w(.)$ represents linear weighting, as defined in Equation 9.

$$w = 1, \text{ for } \frac{P_d}{P_u} > Pr_{min} \quad \text{(Equation 9)}$$

$$w = 1 - \frac{\frac{P_d}{P_u} - Pr_{min}}{Pr_{max} - Pr_{min}}, \text{ for } Pr_{min} < \frac{P_d}{P_u} < Pr_{max}$$

$$w = 0, \text{ for } \frac{P_d}{P_u} > Pr_{max}$$

In Equation 9, $Pr_{min}$ and $Pr_{max}$ are variables in the range of [0, 1]. $Pr_{min}$ and $Pr_{max}$ are dependent on the ratio of specific heats of the gas γ, the flow rate Q, and the nozzle orifice size. According to one specific example, $Pr_{min} = 0.53$ and $Pr_{max} = 0.63$ for a nozzle size of 0.012", which provides a flow rate for nitrogen gas of 2000 sccm at 40 psia.

According to some examples, the weighting function $f_w(.)$ represents cubic weighting, as defined in Equation 10.

$$w = 1, \text{ for } \frac{P_d}{P_u} < Pr_{min} \quad \text{(Equation 10)}$$

$$w = 1 - \left(\frac{\frac{P_d}{P_u} - Pr_{min}}{Pr_{max} - Pr_{min}}\right)^3,$$

$$\text{for } Pr_{min} < \frac{P_d}{P_u} < Pr_{max}$$

$$w = 0, \text{ for } \frac{P_d}{P_u} > Pr_{max}$$

In Equation 10, $Pr_{min}$ and $Pr_{max}$ are variables in the range of [0, 1]. $Pr_{min}$ and $Pr_{max}$ are dependent on the ratio of specific heats of the gas γ, the flow rate Q, and the nozzle orifice size. According to one specific example, $Pr_{min} = 0.43$ and $Pr_{max} = 1$ for a nozzle size of 0.028", which provides a flow rate for nitrogen gas of 10,000 sccm at 40 psia.

According to some examples, the weighting function $f_w(.)$ represents $N^{th}$ degree weighting, as defined in Equation 11. The linear weighting of Equation 9 and the cubic weighting of Equation 10 are examples of the $N^{th}$ degree weighting of Equation 11, where N=1 or 3, respectively. In other examples, N can have any practical or suitable value.

$$w = 1, \text{ for } \frac{P_d}{P_u} < Pr_{min} \quad \text{(Equation 11)}$$

$$w = 1 - \left( \frac{\frac{P_d}{P_u} - Pr_{min}}{Pr_{max} - Pr_{min}} \right)^N,$$

$$\text{for } Pr_{min} < \frac{P_d}{P_u} < Pr_{max}$$

$$w = 0, \text{ for } \frac{P_d}{P_u} > Pr_{max}$$

In Equation 11, $Pr_{min}$ and $Pr_{max}$ are variables in the range of [0, 1]. $Pr_{min}$ and $Pr_{max}$ are dependent on the ratio of specific heats of the gas γ, the flow rate Q, and the nozzle orifice size. N is a positive coefficient which may either be a fixed constant or may depend on the ratio of specific heats of the gas y, the flow rate Q, and the nozzle orifice size.

Figure 4:
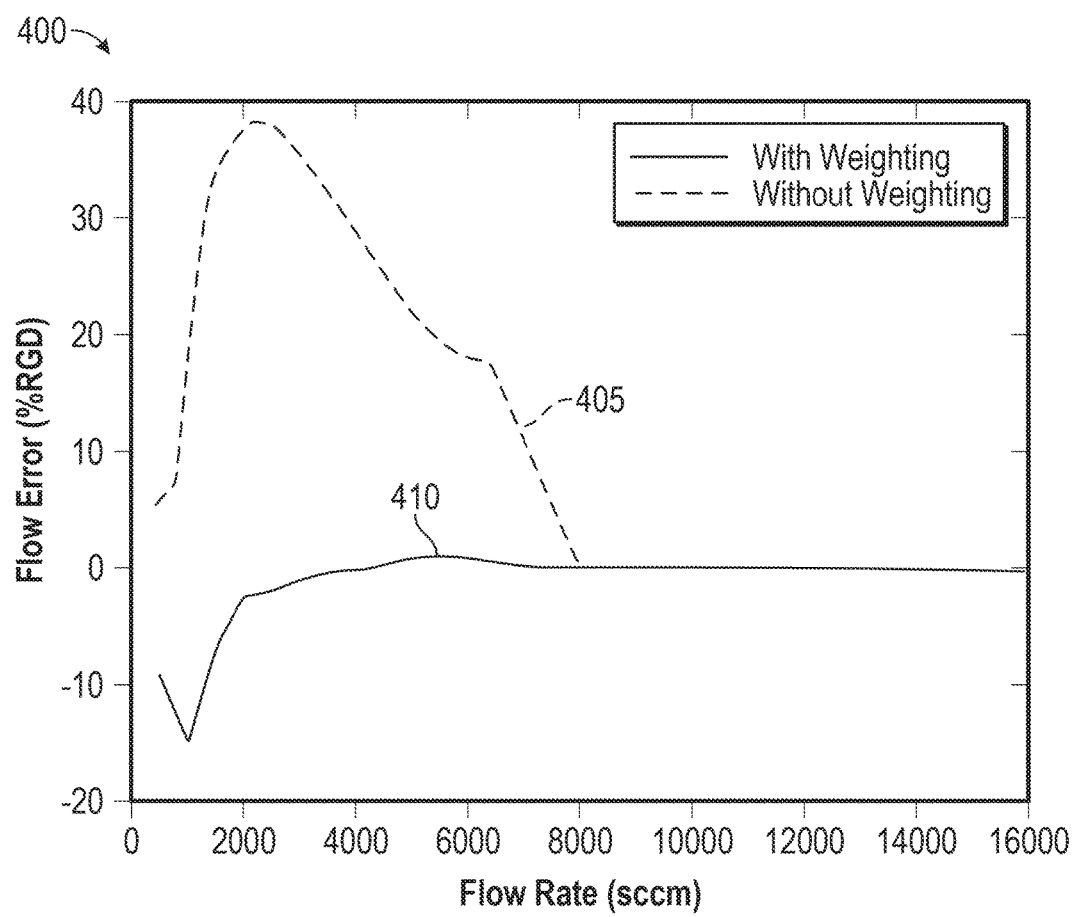
FIG. 4 illustrates an example flow calculation error using a second aspect of the subject technology.

FIG. 4 illustrates a graph 400 of flow calculation error using aspects of the subject technology. In the graph 300 of FIG. 3, the flow of a pressure-based MFC is provided taking into account the measured upstream pressure $P_u$, without measuring the downstream pressure $P_d$. Curve 405 is based on Equations (1)-(6) but does not implement weighting as described in conjunction with Equations (7)-(11). Curve 410 implements the Equations (1)-(6), as well as the Weighting Equations (7)-(11). As illustrated in FIG. 4, the curve 410 converges much faster than the curve 405, but both curves eventually converge at the same result.

Figure 5A:
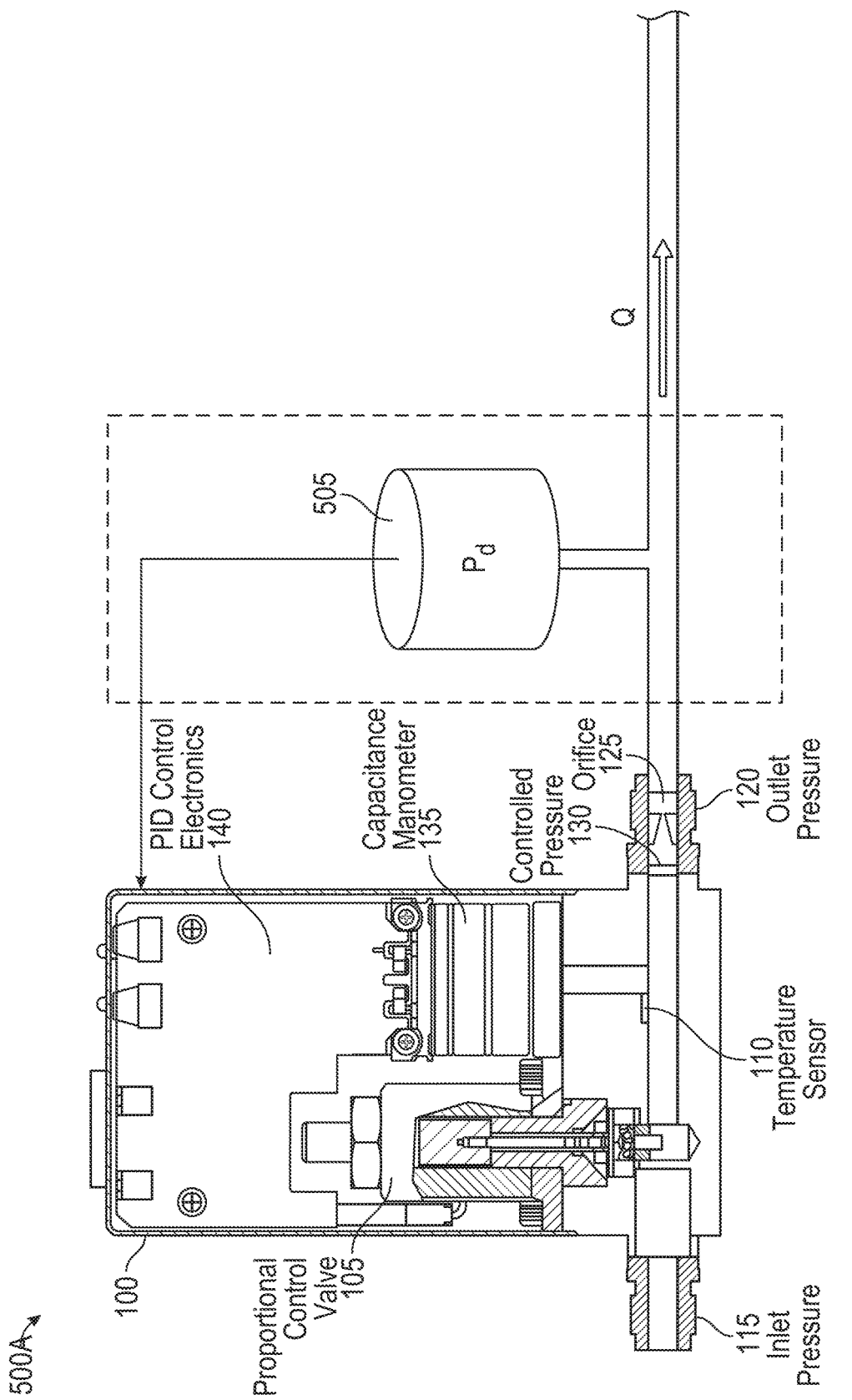
FIG. 5A illustrates an example mass flow controller coupled with an external downstream pressure sensor.

FIG. 5A illustrates an example system 500A including the MFC 100 coupled with an external downstream pressure sensor 505. As shown, the MFC 100 includes the proportional control valve 105, the temperature sensor 110, the inlet pressure 115, the outlet pressure 120, the orifice 125, the controlled pressure 130, the capacitance manometer 135, and the PID control electronics 140. While any capacitance manometer may be used in conjunction with the subject technology as the capacitance manometer 135 (or the MFC 100 may lack a capacitance manometer), according to some examples, the capacitance manometer 135 is a Baratron® capacitance manometer manufactured by MKS Instruments, Inc., of Andover, Mass.

The external downstream pressure sensor 505 measures the outlet pressure 120 of the gas exiting the orifice 135 and provides the measured downstream pressure $P_d$ to the PID control electronics 140 without requiring the downstream pressure sensor to be included within the MFC 100. The PID control electronics 140 may then determine the flow rate Q based on the measured (by as sensor in the MFC 100) upstream pressure $P_u$ and the measured (by the external downstream pressure sensor 505) downstream pressure $P_d$. In the aspect described in conjunction with FIGS. 5A-B, the PID control electronics 140 may determine Q using Equations (1)-(4), and does not need to rely on the techniques for estimating Pd provided by Equations (5)-(11) because a measured value of $P_d$ is provided by the downstream pressure sensor 505.

According to some examples, the downstream pressure sensor 505 is, e.g., an upstream pressure sensor of a different pressure-based MFC adjacent to or part of the MFC 100. A digital communication interface may be provided for adjacent pressure-based MFCs to communicate with one another. The digital communication interface may include DNET, EtherCat or ProfiBus or any other suitable bus or network.

Figure 5B:
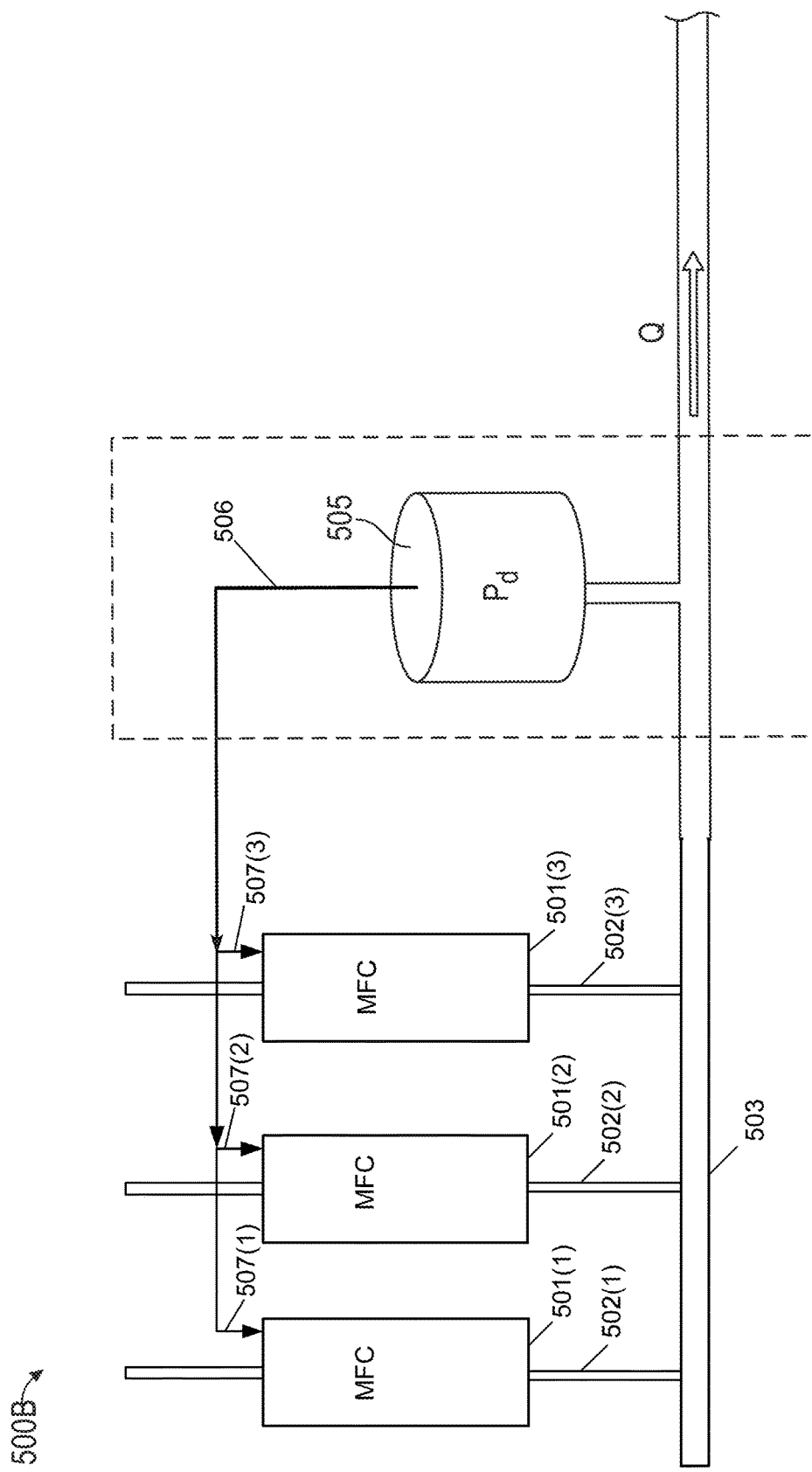
FIG. 5B illustrates multiple example mass flow controllers coupled with an external downstream pressure sensor.

As illustrated in FIG. 5A, the downstream pressure sensor 505 may be connected to a single MFC 100. However, as further illustrated in FIG. 5B, the downstream pressure sensor 505 may be one that is used by or connected to multiple MFCs and/or MFVs 501(1)-(3), which may have similar or identical structure as MFC 100. The MFCs 501(1)-(3) may be connected by a common manifold 503, e.g., respective outputs 502(1)-(3) of the MFCs 501(1)-(3) can be fed into the manifold 503. An output 507 that includes a signal, indicative of the sensed pressure downstream in the manifold 503, can be provided over one or more connections or communication links (e.g., buses or other conductive paths, wireless RF or optical transmissions, or the like) as inputs 507(1)-(3) to the MFCs 501(1)-(3), respectively. An advantage afforded by such a configuration as shown in FIG. 5B is that a single downstream pressure sensor may provide downstream pressure measurement signals to multiple upstream devices (e.g., MFCs) via repurposed inputs to those devices. This can result in the MFCs being able to adequately measure flow for un-choked conditions (flow regimes) without them being required to each have their own integrated (and costly) second pressure sensor. Such a downstream pressure sensor 505 may also or instead be used for flow verification of the multiple upstream devices 505(1)-505(3), e.g., by use of one or more MFVs. For some embodiments, one or more of the multiple MFCs (and/or MFVs) 501(1)-(3) shown in FIG. 5B may be operative to provide downstream pressure estimation, though this is not required.

Figure 6:
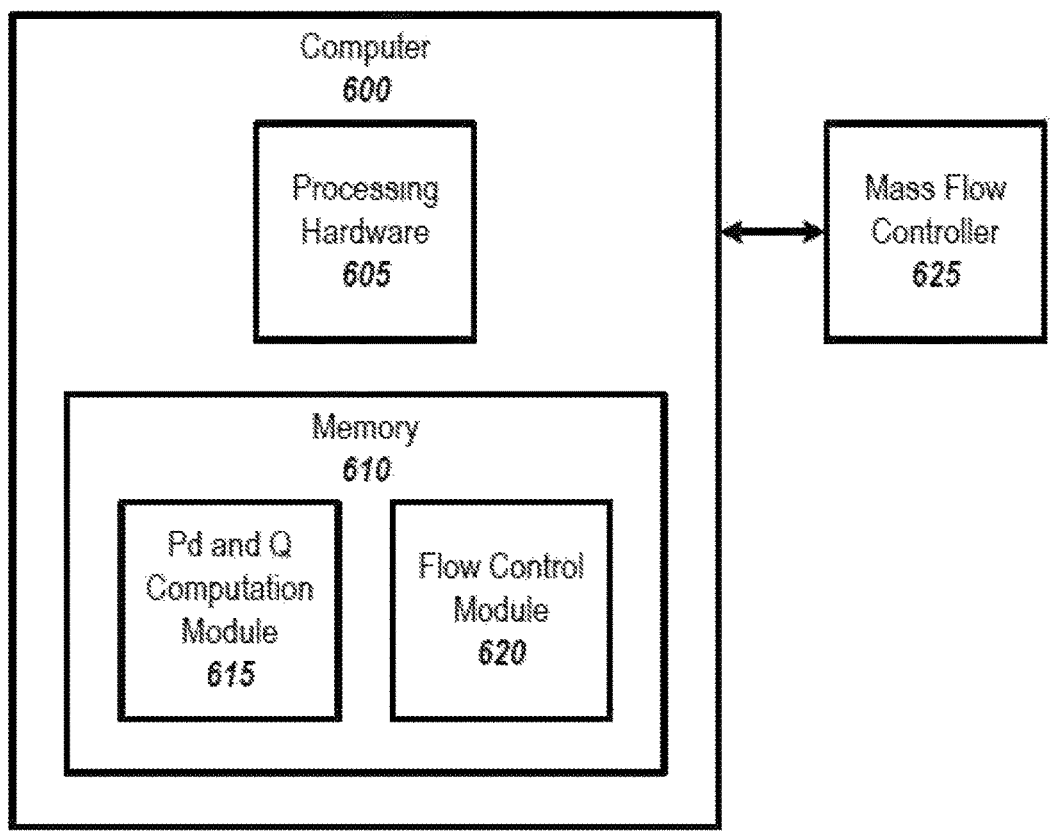
FIG. 6 illustrates an example computer coupled with a mass flow controller.

FIG. 6 illustrates an example computer 600 (or, processing system) coupled with a MFC 625. The computer 600 may be coupled with the MFC 625 using a suitable connection or connections (e.g., one or more communication wires, buses, or conductive paths and/or wireless communication links) and/or implementing one or more communication interfaces. The MFC 625 may correspond to the MFC 100 or the MFC 200 or other suitable MFCs. As shown, the computer 600 can be external to the MFC 625. However, in some implementations, the computer 600 is a component of the MFC 625. For example, the computer 600 may correspond to the PID control electronics 140 in the MFC 100 of FIG. 1.

The computer 600 may be any device that includes a processor and a memory (or that is linked to a memory), such as the PID control electronics 140. Alternatively, the computer 600 may be a standalone device, such as a laptop computer, a desktop computer, a mobile phone, a tablet computer, a dedicated control machine, etc., coupled with the MFC 625. As shown, the computer 600 includes processing hardware 605 and a memory 610. The processing hardware 605 may include a single processor or multiple processors. In a multiple processor implementation, the multiple processors may be arranged into processing units, such as a central processing unit, a graphics processing unit, etc. The memory 610 stores data accessible to the processing hardware 605 and machine-readable instructions which may be implemented by the processing hardware 605. The memory 610 may be a non-transitory machine-readable medium. The memory 610 may include a cache unit, a storage unit, a long-term memory, a short-term memory, etc. As shown, the memory includes a $P_d$ and Q computation module 615 and a flow control module 620.

The $P_d$ and Q computation module 615, when executed by the processing hardware 605, causes the processing hardware 605 to compute the downstream pressure $P_d$ and the flow rate Q for the MFC 625 based on an input upstream pressure $P_u$ from the MFC 625. The Pd and Q computation module 615 may use any process described herein for its computation, for example, the processes described above in conjunction with Equations (1)-(11) or the processes described below in conjunction with FIGS. 7-8. Instructions for implementing the processes described below in conjunction with FIGS. 7-8 may be stored in the memory 610 of the computer 600.

The flow control module 620, when executed by the processing hardware 605, causes the processing hardware 605 to control a flow through the MFC 625 based on the flow rate Q computed by the Pd and Q computation module 615. For example, the flow control module 620 may adjust operation of the proportional control valve 105 (in the MFC 100 of FIG. 1) to control the flow.

Figure 7:
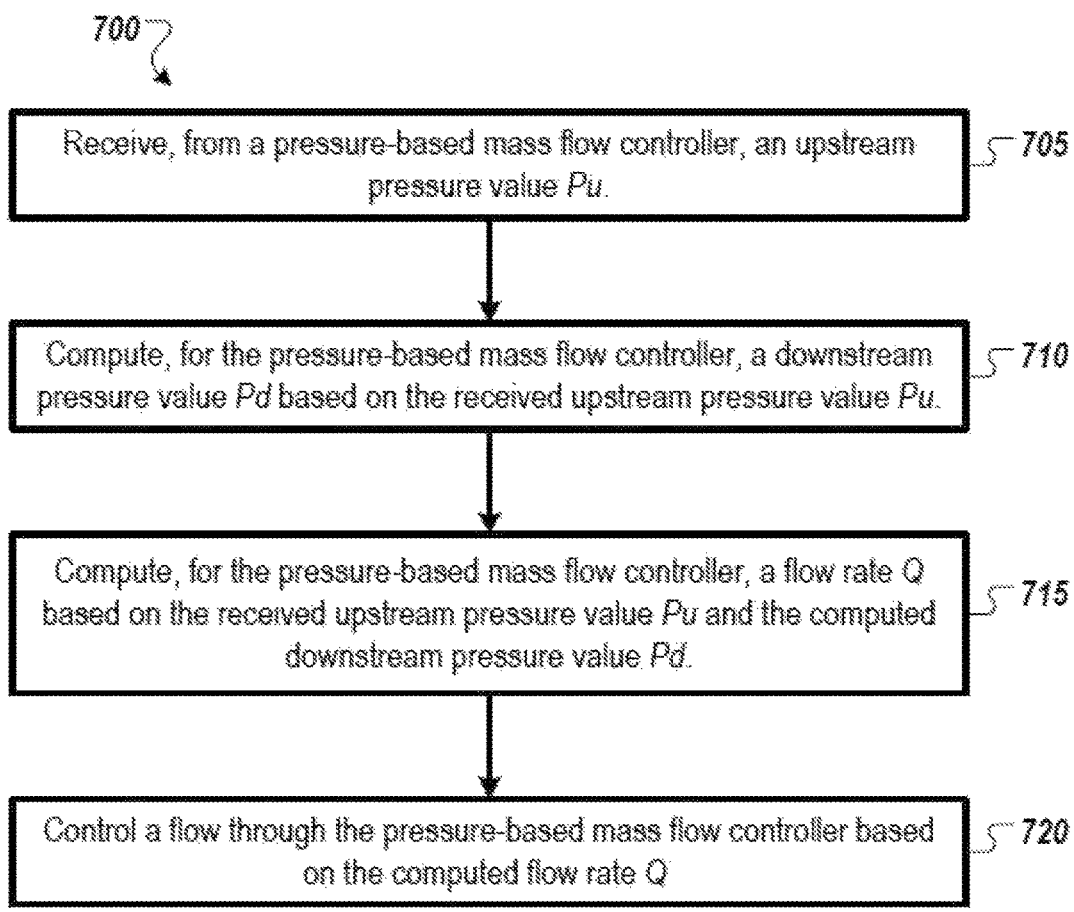
FIG. 7 illustrates a first example process for computing a downstream pressure value and a flow rate for a mass flow controller. [make sure there the method steps are shown and described]

FIG. 7 illustrates a first example process 700 for computing (e.g., calculating or determining) a downstream pressure value $P_d$ and a flow rate Q for a MFC (e.g., MFC 100, 200, or 625). As described below, the process 700 may be implemented at a computer (e.g., computer 600) or other suitable processing system. However, the process 700 may also be implemented within the MFC, for example, at the PID control electronics 140.

The process 700 begins at step 705, where the computer receives, from a pressure-based MFC, an upstream pressure value $P_u$. The upstream pressure value $P_u$ may be measured, at the MFC, using a pressure sensor in the MFC. The MFC may have an upstream pressure sensor but no downstream pressure sensor.

At step 710, the computer computes, for the pressure-based MFC, a downstream pressure value $P_d$ based on the received upstream pressure value $P_u$. The computer may compute $P_d$ based on any combination of the equations (1)-(11) provided herein. In some cases, the computation of the downstream pressure value $P_d$ may be an iterative process.

At step 715, the computer computes, for the pressure-based MFC, a flow rate Q based on the received upstream pressure value $P_u$ and the computed downstream pressure value $P_d$. The computer may compute Q based on any combination of the equations (1)-(11) provided herein. In some cases, the computation of the flow rate Q may be an iterative process.

At step 720, the computer controls a flow through the pressure-based MFC based on the computed flow rate Q. For example, the computer may increase or decrease the flow rate based on the computed flow rate and a desired flow rate. After step 720, the process 700 ends.

FIG. 8 illustrates a second example process 800 for computing a downstream pressure value $P_d$ and a flow rate Q for a (e.g., MFC 100, 200, or 625). As described below, the process 800 may be implemented at a computer (e.g., computer 600) or other suitable processing system. However, the process 800 may also be implemented within the MFC, for example, at the PID control electronics 140.

The process 800 begins at step 805, where the computer receives an initial downstream pressure value $P_{d0}$ for a pressure-based MFC. The initial downstream pressure value $P_{d0}$ may correspond to a pressure measured at the upstream pressure sensor of the MFC when the valve is closed and the pressure is constant throughout the chamber of the MFC. The MFC may have an upstream pressure sensor for measuring upstream pressure and may lack a downstream pressure sensor for measuring downstream pressure.

At step 810, the computer sets, in its memory, a stored downstream pressure value $P_d$ to the received initial downstream pressure value $P_{d0}$. $P_{d0}$ may accurately reflect the initial value of $P_d$ before opening the valve and beginning operation of the MFC.

At step 815, the computer receives, from the pressure-based MFC, a new measured upstream pressure value $P_u$. The upstream pressure may change during operation of the MFC. Updated measurements of the upstream pressure may be provided from the MFC to the computer.

At step 820, the computer determines, based on $P_d$ and $P_u$, whether a flow condition in the pressure-based MFC is critical or non-critical. For example, the computer may use Equations (1) or (3) to determine whether the flow condition is critical or non-critical. The Equations (1)-(11) provided herein may be stored at the computer.

At step 825, the computer computes the flow rate Q based on whether the flow condition is critical or non-critical, as determined at step 820. For example, if the flow condition is critical, the computer may use Equation (2) to compute Q. If the flow condition is non-critical, the computer may use Equation (4) alone or in combination with the weighting equations (7)-(11) to compute Q.

At step 830, the computer may update the stored downstream pressure value $P_d$ based on the computed value of the flow rate Q. For example, the computer may use Equation (5) alone or in combination with Equation (6) in order to update the stored $P_d$ value. The computer may compare the current value of Q with a previously computed value of Q and the current value of $P_d$ with a previously computed value of $P_d$ to determine whether the computed values of Q and $P_d$ have converged.

In step 835, the computed determines whether the computed values of $P_d$ and Q have converged. If both values have converged, the process 800 continues to step 840. If at least one value has not converged, the process 800 returns to step 815, and the steps 815-830 are iteratively repeated until the valued of $P_d$ and Q converge.

At step 840, after the values of $P_d$ and Q have converged, the computer controls a flow through the pressure-based mass flow controller based on the computed flow rate Q. For example, the computer may increase or decrease the flow rate based on the computed flow rate and a desired flow rate. After step 840, the process 800 ends.

Figure 9:
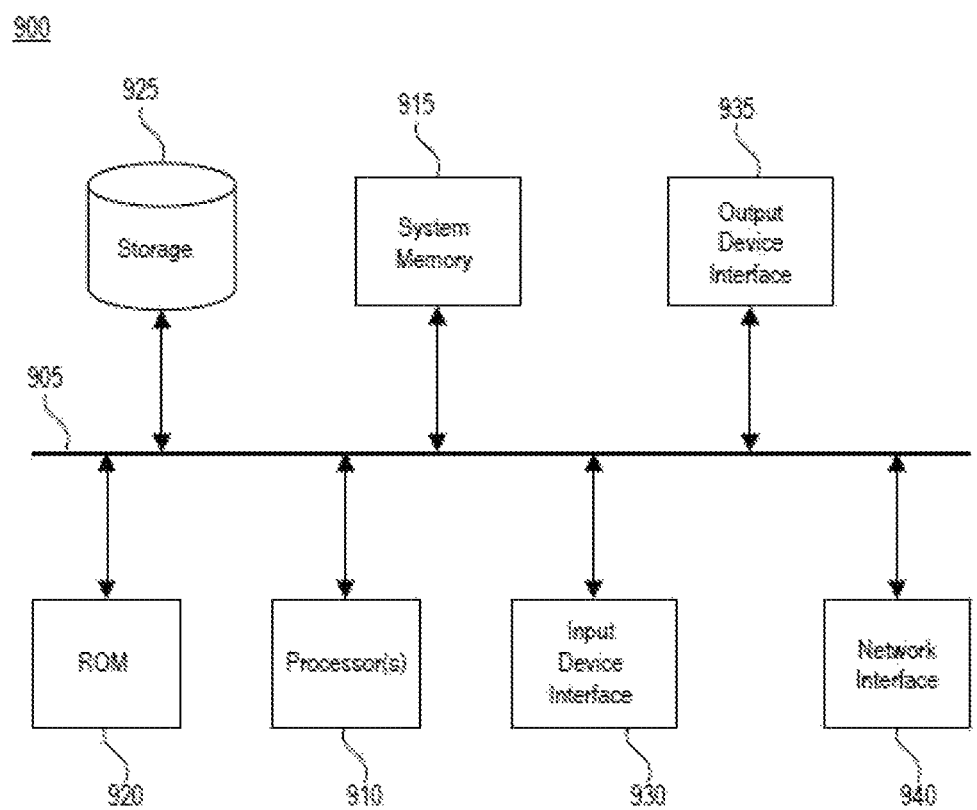
FIG. 9 conceptually illustrates an example electronic system with which some implementations of the subject technology are implemented.

FIG. 9 conceptually illustrates an electronic system 900 with which some implementations of the subject technology are implemented. For example, the computer 600 or the PID control electronics 140 may be implemented using the arrangement of the electronic system 900. The electronic system 900 can be a computer (e.g., a mobile phone, PDA), or any other sort of electronic device. Such an electronic system can include various types of computer readable media and interfaces for various other types of computer readable media. Electronic system 900 includes a bus 905, processor(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processor(s) 910 with the read-only memory 920, the system memory 915, and the permanent storage device 925.

From these various memory units, the processor(s) 910 retrieves instructions to execute and data to process in order to execute the processes of the subject technology. The processor(s) can include a single processor or a multi-core processor in different implementations.

The read-only-memory (ROM) 920 stores static data and instructions that are needed by the processor(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for pressure-based flow measurement in accordance with some implementations.

From these various memory units, the processor(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touch screen that functions as both input and output devices.

Finally, as shown in FIG. 9, bus 905 also couples electronic system 900 to a network (not shown) through a network interface 940. In this manner, the electronic system 900 can be a part of a network of computers (for example a local area network (LAN), a wide area network (WAN), or an Intranet, or a network of networks, for example the Internet. Any or all components of electronic system 900 can be used in conjunction with the subject technology. In some cases, some or all of the components of the electronic system 900 may be coupled with a MFC (e.g., MFC 100, 200 or 625) or a part of a MFC.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The components, steps, features, objects, benefits, and advantages that have been discussed are merely illustrative. None of them, or the discussions relating to them, is intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A system for pressure-based flow measurement of a fluid flow, the system comprising:
   a pressure-based mass flow controller (MFC) including a flow control valve, a flow restrictor, and a pressure sensor upstream of the flow restrictor, wherein the flow control valve, flow restrictor and pressure sensor are disposed along a flow stream;
   one or more processors coupled with the pressure-based mass flow controller (MFC); and
   memory coupled to the one or more processors, the memory including instructions which, when executed by the one or more processors, cause the one or more processors to
   (i) receive, from the pressure-based mass flow controller (MFC), a sensed upstream pressure value $P_u$;
   (ii) calculate, for the pressure-based mass flow controller (MFC), without a measured flow input, a downstream pressure value $P_d$ based on the received sensed upstream pressure value $P_u$;
   (iii) calculate, for the pressure-based mass flow controller (MFC), without a measured downstream pressure, a flow rate Q based on the received upstream pressure value $P_u$ and the calculated downstream pressure value $P_d$, where the instructions to calculate the downstream pressure $P_d$ and the instructions to calculate the flow rate Q include instructions to recursively calculate, based on $P_u$, the flow rate Q based on calculated $P_d$ and the downstream pressure $P_d$ based on calculated Q until the values of Q and $P_d$ converge within an error threshold; and
   (iv) control a flow through the pressure-based mass flow controller (MFC) based on the calculated flow rate Q.

2. The system of claim 1, wherein the flow restrictor comprises a flow nozzle or orifice.

3. The system of claim 1, where the instructions to calculate the downstream pressure $P_d$ and the instructions to calculate the flow rate Q include instructions to set $P_d$ to an initial value $P_{d0}$.

4. The system of claim 1, where the instructions to calculate the downstream pressure $P_d$ and the instructions to calculate the flow rate Q include:
   instructions to set $P_d$ to an initial value $P_{d0}$, and instructions to recursively calculate the flow rate Q and $P_d$ based on calculated $P_d$ and Q, respectively, until the values of Q and $P_d$ converge within a pre-defined error threshold;
   receive, from the pressure-based mass flow controller (MFC), an updated upstream pressure value $P_u$; and
   determine, based on $P_d$ and $P_u$, whether a flow condition in the pressure-based mass flow controller (MFC) is critical or non-critical flow; and
   calculate Q based on whether the flow condition is critical or non-critical flow; and update $P_d$ based on the calculated value of Q.

5. The system of clause 4, where the instructions to update $P_d$ based on the calculated value of Q include instructions to calculate the downstream pressure value $P_d$ according to an equation $P_d = P_{d0} + f(Q, P_u, \gamma, M)$, where $P_{d0}$ is an initial downstream pressure, $\gamma$ is a ratio of specific heat of a flowing gas, M is a molecular weight of the flowing gas, and $f(\ )$ is a function of Q, $P_u$, $\gamma$, M.

6. The system of claim 5, where $f$ is a linear function of Q, a linear function of $P_u$, a linear function of $\gamma$, and a linear function of M.

7. The system of claim 4, where the instructions to determine whether the flow condition is critical or non-critical include instructions to determine that a flow condition is critical if $P_d/P_u$ is less than $[2/(\gamma+1)]^{[\gamma/(\gamma-1)]}$; and determine that a flow condition is non-critical if $P_d/P_u$ is greater than or equal to $[2/(\gamma+1)]^{[\gamma/(\gamma-1)]}$, where $\gamma$ is a ratio of specific heat of a flowing gas.

8. The system of claim 4, where the instructions to calculate Q include instructions to calculate Q using a critical flow equation if the flow condition is critical; and calculate Q using a non-critical flow equation, if the flow condition is non-critical.

9. The system of claim 4, where the instructions to calculate Q include instructions to, upon determining that the flow condition is non-critical calculate a critical flow rate $Q_{cf}$ using a critical flow equation; calculate a non-critical flow rate $Q_{ncf}$ using a non-critical flow equation; and calculate Q based on a weighting factor w, the critical flow rate $Q_{cf}$, and the non-critical flow rate $Q_{ncf}$, where $Q = w \cdot Q_{cf} + (1-w) \cdot Q_{ncf}$.

10. The system of claim 9, where the weighting factor w is calculated according to $w = f_w(Q, P_u, P_d, \gamma, M)$, where $\gamma$ is a ratio of specific heat of a flowing gas, M is a molecular weight of the flowing gas and $f_w(\ )$ is a function of Q, $P_u$, $P_d$, $\gamma$, M.

11. The system of claim 9, where $w=1$ if $P_d/P_u$ is less than $Pr_{min}$; $w=0$ if $P_d/P_u$ is greater than $Pr_{max}$; and $w = 1 - [(P_d/P_u - Pr_{min})/(Pr_{max} - Pr_{min})]^N$ if $P_d/P_u$ is greater than $Pr_{min}$ and less than $Pr_{max}$, where $Pr_{min}$ and $Pr_{max}$ are variables between 0 and 1 that are determined based on a ratio of specific heat of a flowing gas $\gamma$, the flow rate Q, and a nozzle orifice size of the flow-restricting orifice of the pressure-based mass flow controller (MFC).

12. The system of claim 11, where N is a positive exponential coefficient that is determined based on $\gamma$, Q, and the nozzle orifice size of the flow-restricting orifice of the pressure-based mass flow controller (MFC).

13. The system of claim 1, wherein the memory further includes instructions which, when executed by the one or more processors, cause the one or more processors to:

receive an initial downstream pressure value $P_{d0}$ for the pressure-based mass flow controller (MFC);
set a stored downstream pressure value $P_d$ to the received initial downstream pressure value $P_{d0}$;
recursively calculate the flow rate Q and $P_d$ based on calculated Q and $P_d$ respectively, until the values of Q and $P_d$ converge within a pre-defined error threshold;
receive, from the pressure-based mass flow controller (MFC), an upstream pressure value $P_u$;
determine, based on $P_d$ and $P_u$, whether a flow condition in the pressure-based mass flow controller (MFC) is critical or non-critical flow;
calculate Q based on whether the flow condition is critical or non-critical; and update $P_d$ based on the calculated value of Q; and
cause the one or more processors to, after the calculated flow rate Q and the stored downstream pressure value $P_d$ converge to respective values within a pre-defined error threshold, control a flow through the pressure-based mass flow controller (MFC) based on the calculated flow rate Q.

14. The system of claim 13, where the initial downstream pressure value $P_{d0}$ corresponds to a measured upstream pressure value before gas begins flowing through the pressure-based mass flow controller (MFC).

15. A non-transitory machine-readable medium comprising instructions which, when executed by a machine, cause the machine to:
receive, from a pressure-based mass flow controller (MFC), an upstream pressure value $P_u$;
calculate, for the pressure-based mass flow controller (MFC), without a measured flow input, a downstream pressure value $P_d$ based on the received upstream pressure value $P_u$;
calculate, for the pressure-based mass flow controller (MFC), without a measured downstream pressure, a flow rate Q based on the received upstream pressure value $P_u$ and the calculated downstream pressure value $P_d$, where the instructions to calculate the downstream pressure $P_d$ and the instructions to calculate the flow rate Q include instructions to recursively calculate, based on $P_u$, the flow rate Q based on calculated $P_d$ and the downstream pressure $P_d$ based on calculated Q until the values of Q and $P_d$ converge within an error threshold; and
control a flow through the pressure-based mass flow controller (MFC) based on the calculated flow rate Q;
wherein the MFC includes a flow control valve, a flow-restricting orifice in the flow path of the flow control valve, and an upstream pressure sensor in the flow path upstream of the flow-restricting orifice.

16. The non-transitory machine-readable medium of claim 15, wherein the machine-readable instructions further comprise instructions to:
cause the machine to receive an initial downstream pressure value $P_{d0}$ for the pressure-based mass flow controller (MFC); and
set a stored downstream pressure value $P_d$ to the received initial downstream pressure value $P_{d0}$;
cause the machine to repeat the determination of the calculated flow rate Q and $P_d$ based on calculated $P_d$ and Q, respectively, until the values of calculated flow rate Q and $P_d$ converge to respective values within a pre-defined error threshold;
receive, from the pressure-based mass flow controller (MFC), an upstream pressure value $P_u$;
determine, based on $P_d$ and $P_u$, whether a flow condition in the pressure-based mass flow controller (MFC) is critical or non-critical;
calculate Q based on whether the flow condition is critical or non-critical; and update $P_d$ based on the calculated value of Q; and
cause the machine to, after the calculated flow rate Q and the stored downstream pressure value $P_d$ converge to respective values within a pre-defined error threshold, control a flow through the pressure-based mass flow controller (MFC) based on the calculated flow rate Q.

17. A method of for pressure-based flow control through a pressure-based mass flow controller (MFC), the method comprising:
receiving an initial downstream pressure value $P_{d0}$ for a pressure-based mass flow controller (MFC); and
setting a stored downstream pressure value $P_d$ to the received initial downstream pressure value $P_{d0}$;
recursively calculate the flow rate Q and $P_d$ based on calculated $P_d$ and Q, respectively, until the values of Q and $P_d$ converge within a pre-defined error threshold;
receiving, from the pressure-based mass flow controller (MFC), a sensed upstream pressure value $P_u$;
determining, based on $P_d$ and $P_u$, whether a flow condition in the pressure-based mass flow controller (MFC) is critical or non-critical;
computing Q based on whether the flow condition is critical or non-critical; and
updating $P_d$ based on the calculated value of Q; and
after the calculated flow rate Q and the stored downstream pressure value $P_d$ converge to respective values within a pre-defined error threshold, controlling a flow through the pressure-based mass flow controller (MFC) based on the calculated flow rate Q;
wherein the pressure-based mass flow controller (MFC) includes a flow control valve, a flow restrictor, and a pressure sensor upstream of the flow restrictor, and wherein the flow control valve, flow restrictor and pressure sensor are disposed along a flow stream.

18. The method of claim 17, wherein the flow restrictor comprises a flow nozzle or orifice.

19. A system for pressure-based flow measurement of a fluid flow, the system comprising:
a pressure-based mass flow controller (MFC) including a flow control valve, a flow restrictor, and a pressure sensor upstream of the flow restrictor, wherein the flow control valve, flow restrictor and pressure sensor are disposed along a flow stream;
one or more processors coupled with the pressure-based mass flow controller (MFC); and
memory coupled to the one or more processors, the memory including instructions which, when executed by the one or more processors, cause the one or more processors to
(i) receive, from the pressure-based mass flow controller (MFC), a sensed upstream pressure value $P_u$;
(ii) recursively calculate, for the pressure-based mass flow controller (MFC), based on the received upstream pressure value $P_u$, and based on calculated Q and $P_d$, respectively, a downstream pressure value $P_d$ and a flow rate Q until the values of Q and $P_d$ converge; and
(iii) control a flow through the pressure-based mass flow controller (MFC) based on the calculated flow rate Q.

* * * * *